United States Patent
Eno et al.

(10) Patent No.: US 7,435,371 B2
(45) Date of Patent: Oct. 14, 2008

(54) METHOD FOR MANUFACTURING RUBBER PARTS COMBINED WITH SUBSTRATE

(75) Inventors: Shin-ichiro Eno, Tokyo (JP); Takuya Funatsu, Utsunomiya (JP); Koji Hirayama, Utsunomiya (JP)

(73) Assignee: Kokoku Intech, Ltd., Tokyo (JP)

( * ) Notice: Subject to any disclaimer, the term of this patent is extended or adjusted under 35 U.S.C. 154(b) by 471 days.

(21) Appl. No.: 10/535,480

(22) PCT Filed: Dec. 12, 2003

(86) PCT No.: PCT/JP03/15991

§ 371 (c)(1),
(2), (4) Date: May 17, 2005

(87) PCT Pub. No.: WO2004/052614

PCT Pub. Date: Jun. 24, 2004

(65) Prior Publication Data

US 2006/0012080 A1    Jan. 19, 2006

(30) Foreign Application Priority Data

Dec. 12, 2002    (JP) ............................. 2002-360864

(51) Int. Cl.
  *B29C 39/10*  (2006.01)
  *B29C 70/74*  (2006.01)
  *B29C 70/78*  (2006.01)

(52) U.S. Cl. ..................... 264/248; 264/238; 264/250; 264/247; 264/328.1; 264/493; 264/494

(58) Field of Classification Search ...................... None
See application file for complete search history.

(56) References Cited

U.S. PATENT DOCUMENTS 1,989,703 A  *  2/1935  Leguillon ................ 428/195.1
2,337,555 A  *  12/1943  Hosking ..................... 428/623

(Continued)

FOREIGN PATENT DOCUMENTS

EP    1 073 138 A2    1/2001

(Continued)

*Primary Examiner*—Edmund H. Lee
(74) *Attorney, Agent, or Firm*—Carella, Byrne, et al.; Elliot M. Olstein; William Squire (57) ABSTRACT

The present invention provides a method for manufacturing rubber parts monolithically combined with the substrate capable of molding, vulcanizing and adhering at a relatively low temperature. The method by the present invention for manufacturing rubber parts monolithically combined with a completed substrate 111, is a method to form rubber parts at precise positions on a substrate 101 comprising: a placing step to place the substrate 101 in a die assembly K for molding rubber parts; a molding step to mold the rubber parts by casting unvulcanized rubber material 102 into the die assembly K in which the substrate 101 is placed; a releasing step to take unvulcanized rubber parts 104 monolithically combined with the substrate 101 out of the die assembly and a vulcanizing step to vulcanize the rubber parts monolithically combined with the substrate.

3 Claims, 9 Drawing Sheets

U.S. PATENT DOCUMENTS

| | | | |
|---|---|---|---|
| 4,217,326 A * | 8/1980 | Goralnik | 264/254 |
| 4,247,510 A * | 1/1981 | Desverchere | 264/236 |
| 4,507,258 A * | 3/1985 | Aoki | 264/255 |
| 4,701,288 A * | 10/1987 | Cook et al. | 264/1.38 |
| 5,164,136 A * | 11/1992 | Comert et al. | 264/232 |
| 5,336,458 A * | 8/1994 | Hutchison et al. | 264/220 |
| 5,440,849 A * | 8/1995 | Agrawal et al. | 52/393 |
| 5,443,673 A * | 8/1995 | Fisher et al. | 156/245 |
| 6,238,609 B1 * | 5/2001 | Stecker | 264/246 |
| 6,413,347 B1 * | 7/2002 | Hosaka et al. | 156/245 |
| 6,562,271 B2 * | 5/2003 | Hiraoka et al. | 264/257 |
| 6,579,487 B1 * | 6/2003 | Lichtinger | 264/255 |

FOREIGN PATENT DOCUMENTS

| | | |
|---|---|---|
| EP | 1 073138 A3 | 1/2001 |
| JP | 48-22198 | 7/1973 |
| JP | 30-9086 | 12/1980 |
| JP | 56-51345 | 5/1981 |
| JP | 3-108412 | 11/1991 |
| JP | 8-73609 | 3/1996 |
| JP | 2002-18890 | 1/2002 |
| JP | 2002-56862 | 2/2002 |
| JP | 2002-137625 | 5/2002 |

* cited by examiner

METHOD FOR MANUFACTURING RUBBER PARTS COMBINED WITH SUBSTRATE

FIELD OF INVENTION

The present invention relates to a method for manufacturing rubber parts combined with a substrate employed as a sealing member for a fuel cell and the like.

RELATED BACKGROUND ARTS

It has been difficult to form rubber parts combined with a substrate at predetermined positions precisely by utilizing rubber parts molded beforehand even if grooves for fixing the rubber parts are formed on the substrate, because rubber parts extend and contract to a large extent.

In adhesive rubber parts, when the parts are adhered to a substrate, the parts are tangled with each other. In thin and long cord-like rubber parts, it is difficult to maintain a predetermined peripheral shape formed by the rubber parts because such rubber parts do not have enough rigidity.

In order to avoid such drawbacks, for example, a method for manufacturing seals for fuel cells by irradiating radioactive rays on rubber parts so as to vulcanize the rubber parts without heating, is known (for example, Japanese laid open patent No. 2002-56862).

Figure 8:
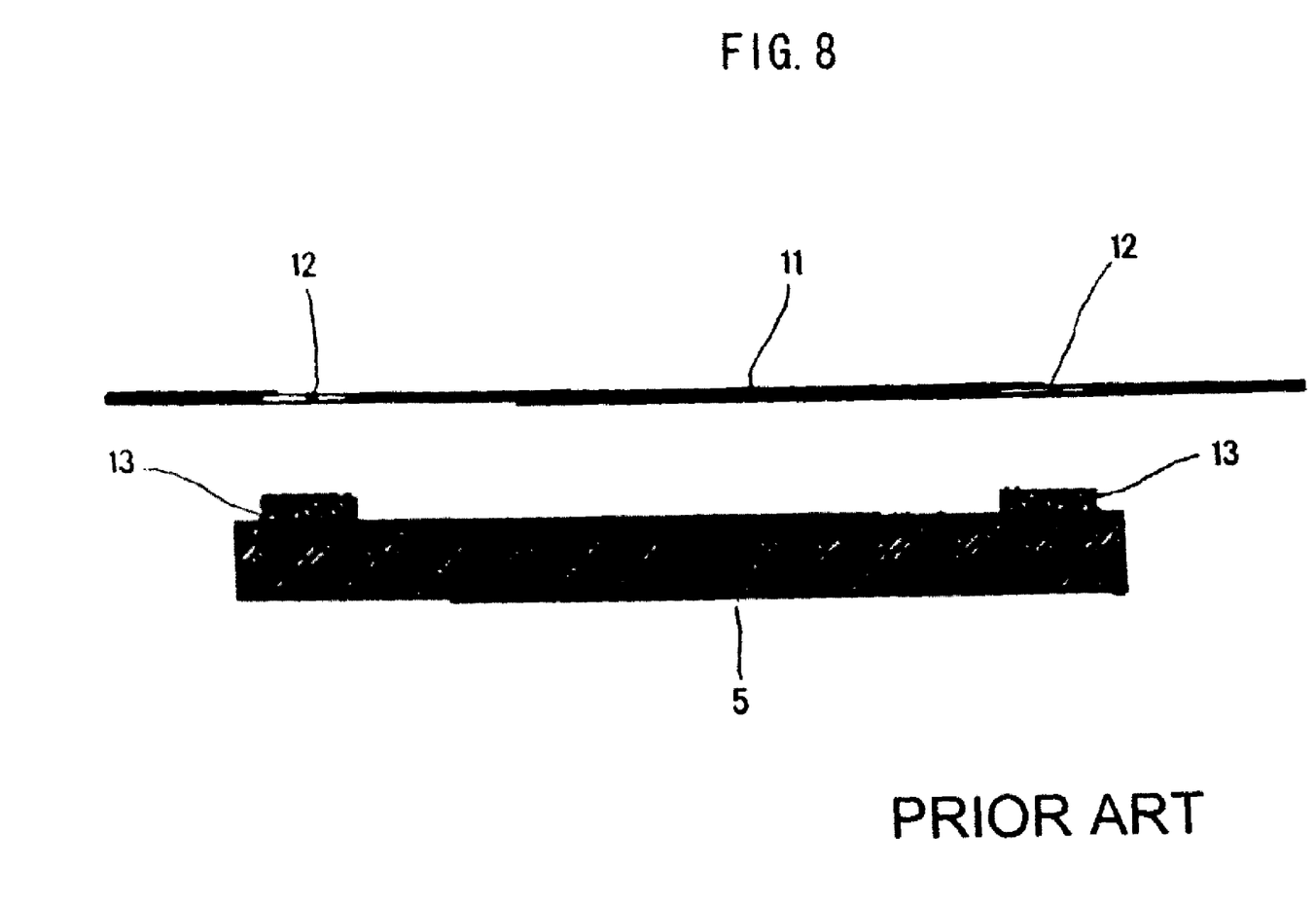
FIG. 8 is a cross-sectional view illustrating a rough arrangement of the conventional art.

The above-mentioned manufacturing method is explained as referring to FIG. 8.

A reference numeral "5" is a substrate used as a cathode electrode separator, a reference numeral "11" is a mask, a reference numeral "12" is openings on the mask and a reference numeral "13" is rubber layers coated on the substrate.

Rubber containing coating agent is coated on the peripheral regions of the substrate by a screen printing method so as to form rubber containing layers, which are vulcanized afterward and used in a rubber packing and the like for a seal structure of a fuel cell.

A surface of the separator 5 is covered with the mask 11, the rubber containing coating agent is applied to the separator over the mask several times so that the rubber layers 13 having a predetermined thickness are formed, the layers are vulcanized after solvent in the layers is removed and consequently, thin rubber layers adhered to the separator 5 are directly formed on the separator.

In other words, unvulcanized rubber is directly applied to the surface of the substrate so as to form the layers which are vulcanized by radioactive rays or the like without heating.

However, in order to form the layers at predetermined positions precisely, this method employ the mask through which the coating agent is applied to the separator, so that it is inevitable that the relatively thin rubber layers are obtained, because a thickness of the layers depends on a thickness of the mask.

The present invention is carried out in view of the problems mentioned above in order to provide a method for manufacturing rubber parts combined with a substrate, capable of being formed, vulcanized and adhered at a relatively low temperature and being formed in a three-dimensional shape.

SUMMARY OF THE INVENTION

A method according to an embodiment of the present invention comprises:

A method for manufacturing rubber parts combined with a substrate at precise positions on the substrate comprising: a placing-molding step to place the substrate in a lower die having a substrate region in which the substrate is placed and to mold the rubber parts by casting unvulcanized rubber material into a space formed between another lower die and an upper die; a positioning step to place the unvulcanized molded rubber parts at desired positions on the substrate by replacing the another lower die with the lower die having the substrate region; removing the unvulcanized rubber parts positioned on the substrate from the die assembly; and a vulcanizing step to vulcanize the unvulcanized rubber parts combined with the substrate without heating.

A method for manufacturing rubber parts combined with a substrate at precise positions on the substrate comprising: a placing-molding step to place the substrate in a lower die having a substrate region on which the substrate is placed and to mold the unvulcanized rubber parts by casting into a space formed between another lower die and an upper die; a positioning step to place the unvulcanized molded rubber parts at desired positions on the substrate by replacing the another lower die with the lower die having the substrate region; and removing the substrate and the unvulcanized rubber parts positioned on the substrate from the die assembly.

DETAILED DESCRIPTION OF THE PREFERRED EMBODIMENTS

Embodiments of the present invention are explained in detail as referring to drawings.

Embodiment 1

Reference characters in FIGS. 1 to 7 are defined as follows. "101" is a substrate made of carbon, a carbon plate, resin, a resin sheet, a resin film, metal, metal plate or the like on which parts are placed. "102" is an unvulcanized rubber material. "103" are gates of the unvulcanized rubber material in gate regions 203. "104" are unvulcanized rubber seals. "105" are vulcanized rubber seals combined with the substrate. "111" is a completed substrate combined with the vulcanized rubber parts. "201" is an upper die. "202" is a first lower die. "203" are the gate regions. "204" is a pot region. "205" is a piston. "206" is a substrate region. "207" is cavities. "211" is a press. "221" is a vulcanizing apparatus as one of the vulcanizing means. "231" is a conveying apparatus. "K" is a die assembly.

Figure 1:
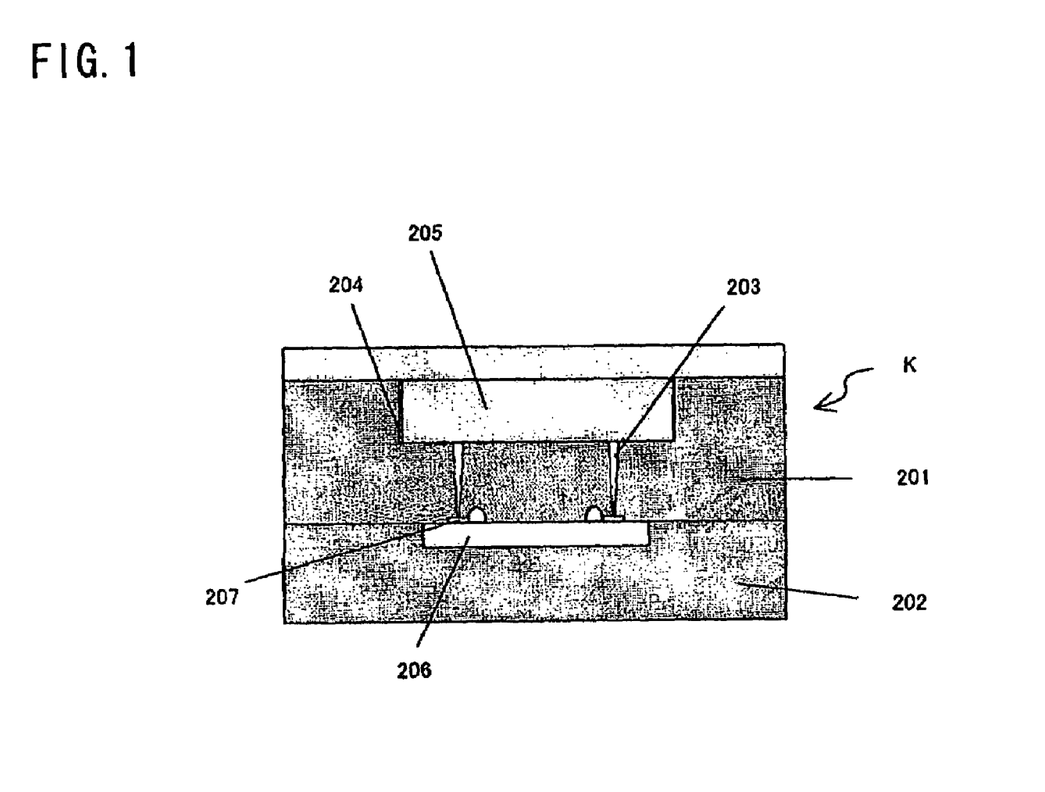
FIG. 1 is a cross-sectional view illustrating a rough die assembly employed in an embodiment of the present invention.

As shown in FIG. 1, the die assembly K employed in the present embodiment comprises the upper die 201 and the first lower die 202 as well as the gate regions 203, the pot region 204 and the piston 205 for pressing and molding.

Further, the first lower die 202 has the substrate region 206 and the upper die 201 has the cavities 207 formed in a desired shape for molding rubber parts.

Figure 9:
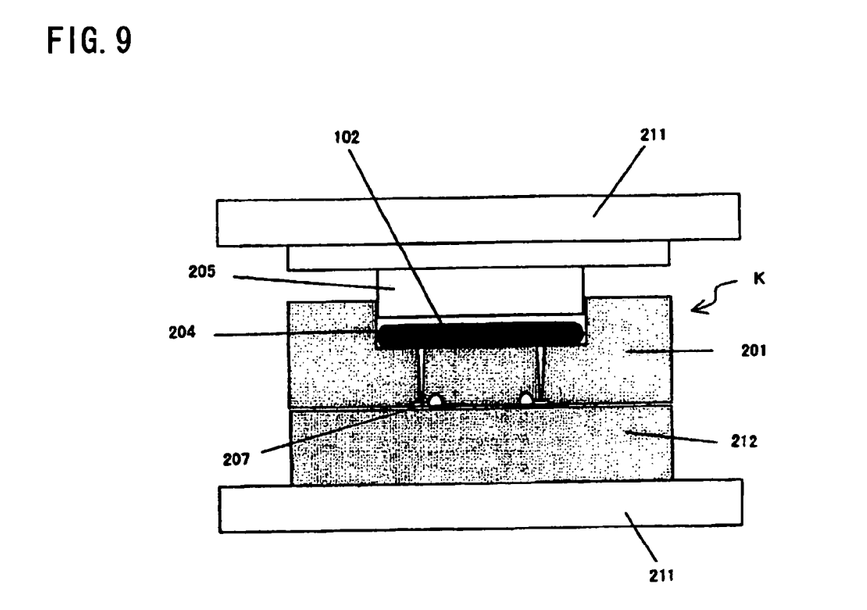
FIG. 9 is a cross sectional view illustrating a molding step utilizing a second further lower die.
Figure 10:
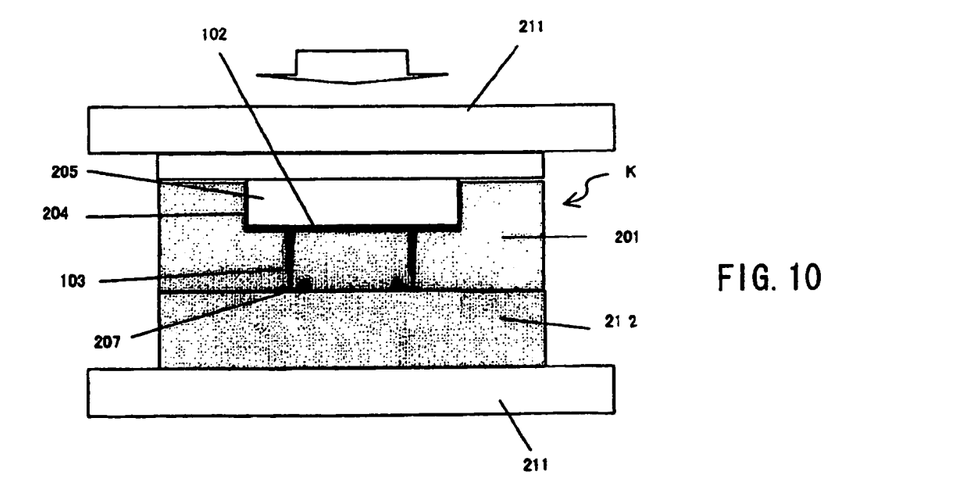
FIG. 10 is a cross sectional view illustrating a state after molding utilizing the second further lower die of FIG. 9.

Two types of lower dies are employed, one is the first lower die 202 having the substrate region in which substrate is placed and the other is a second lower die 212, FIGS. 9 and 10, having no substrate regions, but other dimensions are preferably the same as the first lower die 202.

Figure 2:
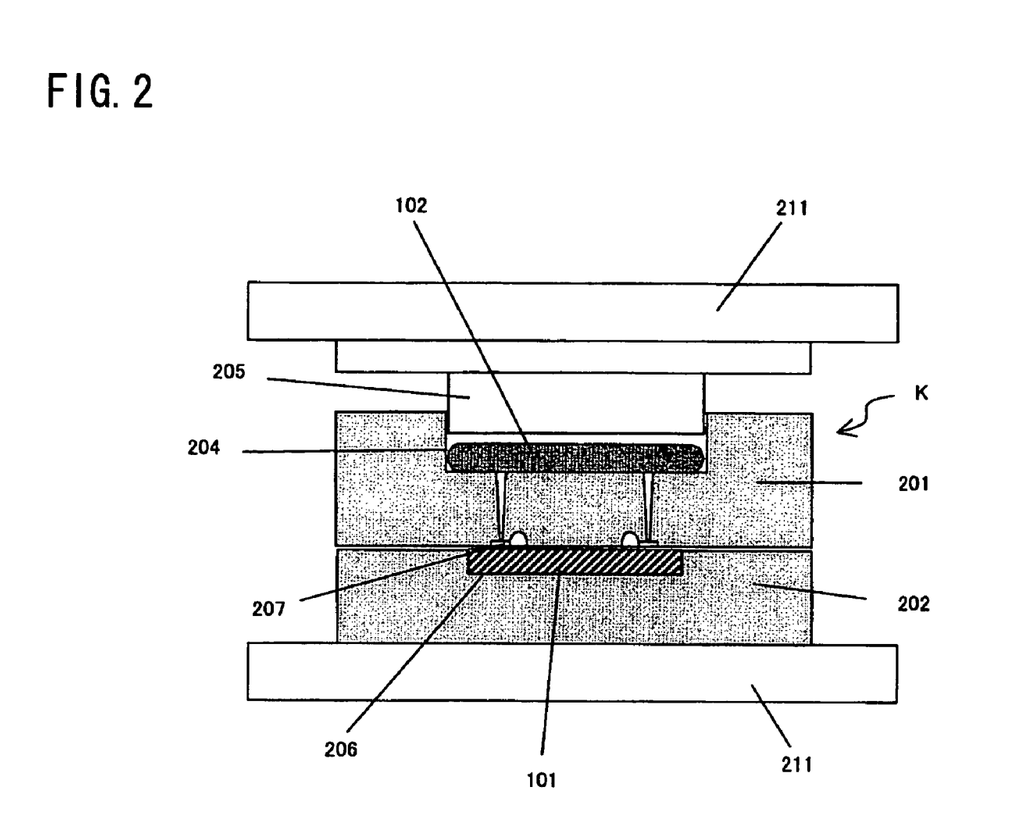
FIG. 2 is a cross-sectional view illustrating a substrate in a placing step in the embodiment of the present invention.

In the method for manufacturing rubber parts combined with the substrate by the present embodiment, the substrate 101 made of a carbon sheet, a resin sheet or the like is placed on the substrate region 206 in the lower die 202 (the placing step, see FIG. 2).

Then unvulcanized rubber parts are molded in a die assembly constituted by combining the second lower die 212 having no substrate region and the upper die 201, see FIG. 9.

At this step, the second die 212 having no substrate region 206 (FIG. 1) is precisely fitted to the upper die 201 and then the piston 205 is pressed by the press so that the rubber material 102 is pressed, see FIG. 10.

Since the other second lower die 212 has no substrate regions 206, only unvulcanized rubber parts having a desired shape are molded, when the rubber material 204 is fed to and fills the cavities 207 of the upper die 201 via the gate regions 203 (a molding step).

In the present embodiment, since the placing step and the molding step do not necessarily carry out in the explained order, combined steps are renamed as a placing-molding step.

Figure 3:
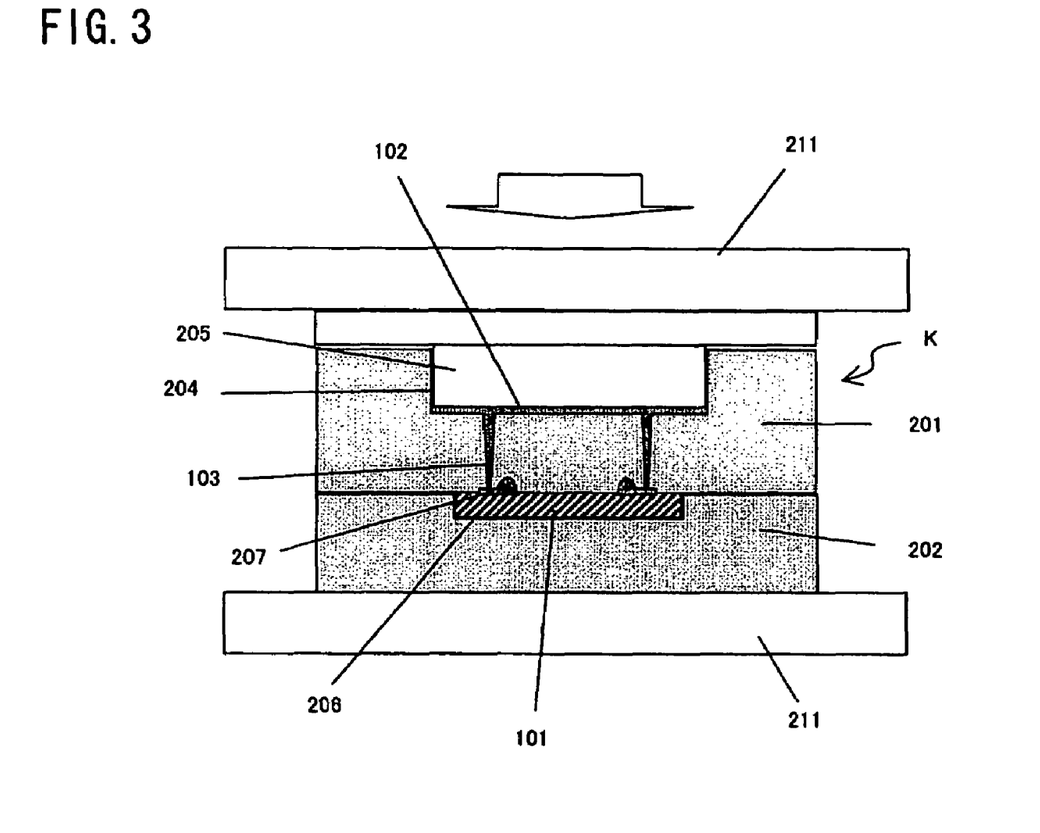
FIG. 3 is a cross-sectional view illustrating the substrate in a molding step.

Then the other lower die is replaced with the lower die 202 having the substrate region in which the substrate 101 is placed by sliding or the like, see FIG. 3. The lower die 202 having the substrate region 206 is fitted precisely to the upper die 201 so that the molded rubber material in the cavities 207 are arranged at the desired position (an arranging step).

The substrate on which the unvulcanized rubber parts are placed, is taken out of the die assembly (a die releasing step, see FIG. 4) and vulcanized without heating (a vulcanizing step, see FIG. 6), thus the rubber parts combined with the substrate are obtained.

Figure 4:
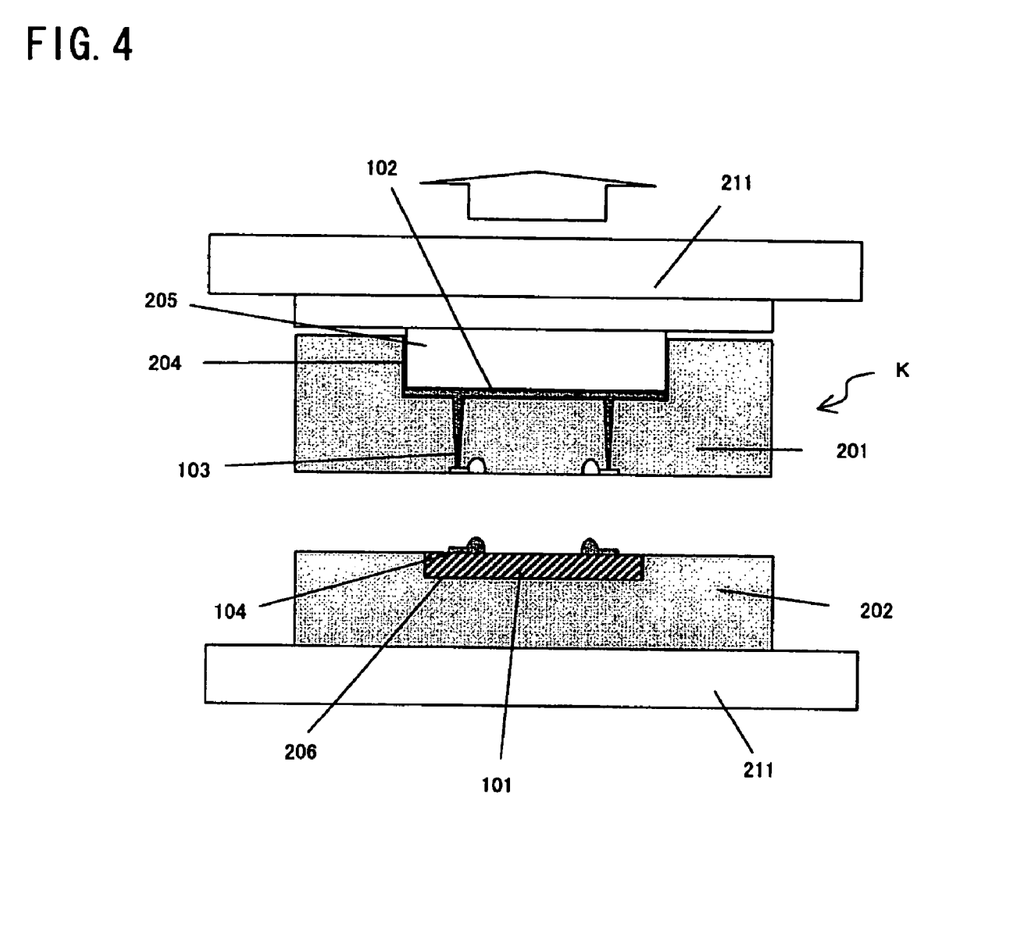
FIG. 4 is a cross-sectional view illustrating the substrate in a die releasing step.

Burrs or dents formed in the rubber seals 104 during separating the gates 103 in the die releasing step can be finished afterward.

Thus, the unvulcanized rubber seals 104 having a desired shape combined with the substrate 101 are obtained.

The rubber material 102 does not drop onto the substrate 101 by forming the ends of the gate regions 203 with relatively narrow tips.

In addition, since the gates 103, burrs formed in the pot region of the die and sprues remain unvulcanized, they can be recycled as the rubber material so that a yield of the rubber material is raised to a large extent.

Figure 5:
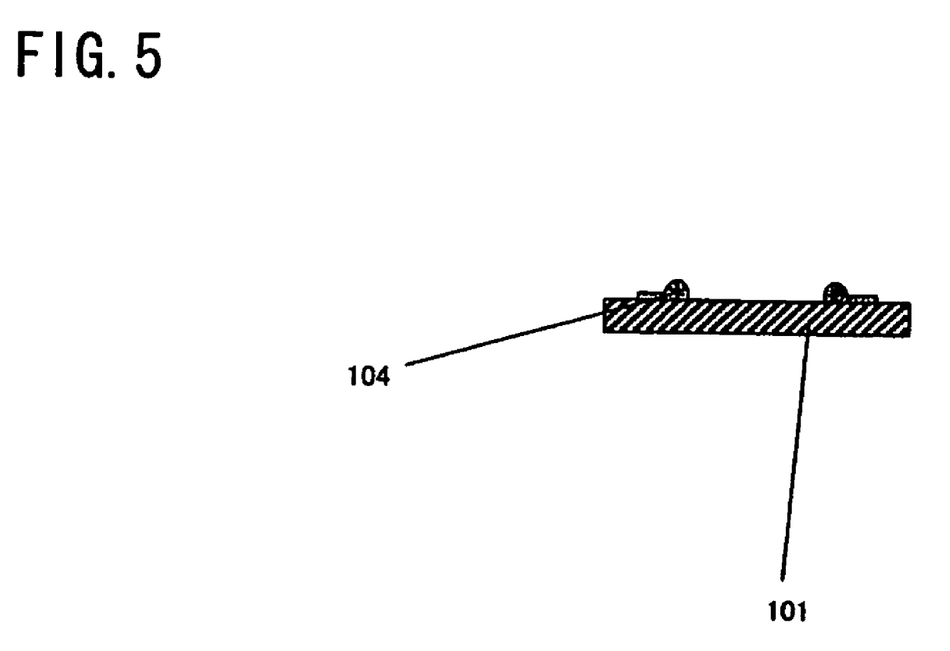
FIG. 5 is a cross-sectional view illustrating the substrate on which unvulcanized rubber parts are placed.

As shown in FIG. 5, the substrate 101 is taken out of the die assembly while keeping the rubber seals placed on the substrate in situ.

The rubber seals 104 are kept in the molded state by a tension, a viscosity and the like of the rubber material, but they are not firmly bonded with the substrate 101.

In the conventional methods, molding cycles are determined by vulcanizing periods in die assemblies. But, a molding cycle of the present embodiment is determined only by a period for casting the rubber material by arranging the molding step and the vulcanizing step as separated steps, so that a manufacturing period is reduced, consequently, a production rate of the die assembly K is remarkably raised.

Figure 6:
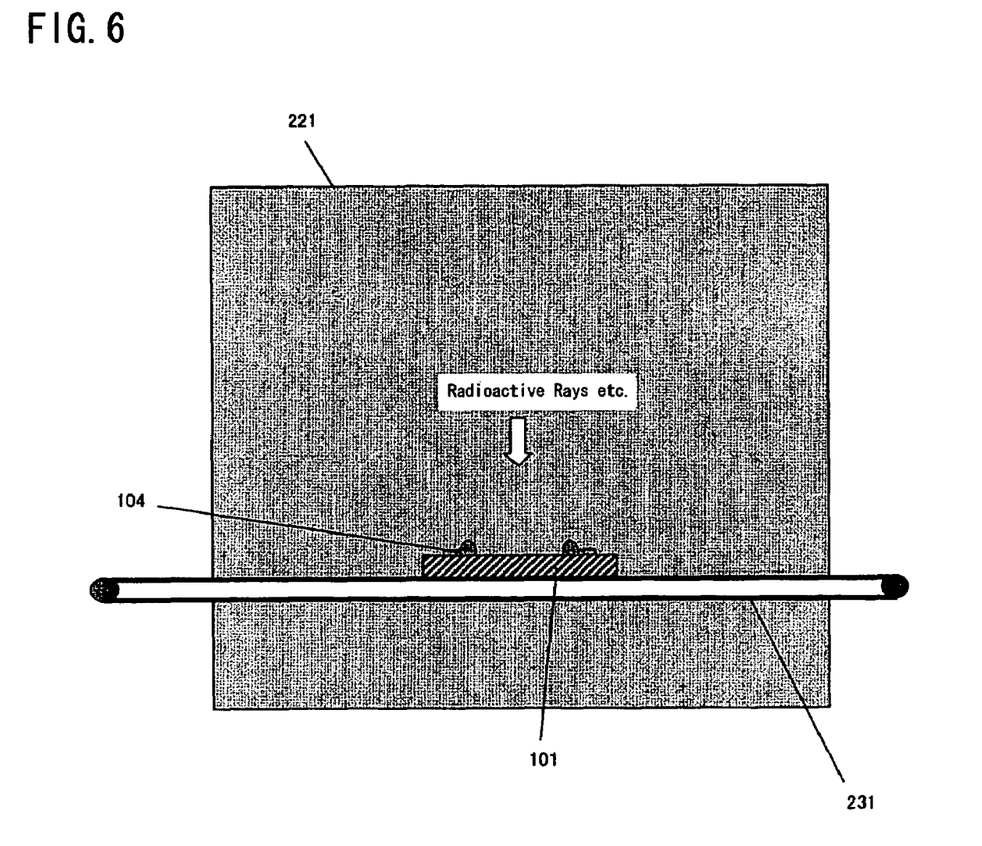
FIG. 6 is a cross-sectional view illustrating the substrate in a vulcanizing step.

The unvulcanized rubber seals 104 are conveyed by the conveyer 231 together with the substrate 101 and vulcanized by irradiating radioactive rays without heating the substrate 101 (the vulcanizing step, see FIG. 6).

As the vulcanizing step, the rubber seals can be bridged by irradiating ultraviolet rays and the like. In the present invention, "vulcanization" is not limited to a step which employs sulfur, but means a bridging step including a narrowly meant vulcanization which employs sulfur. However, since "vulcanization" is commonly and widely interpreted as "bridging" in the art, "vulcanization" is also widely interpreted in the present application.

Figure 7:
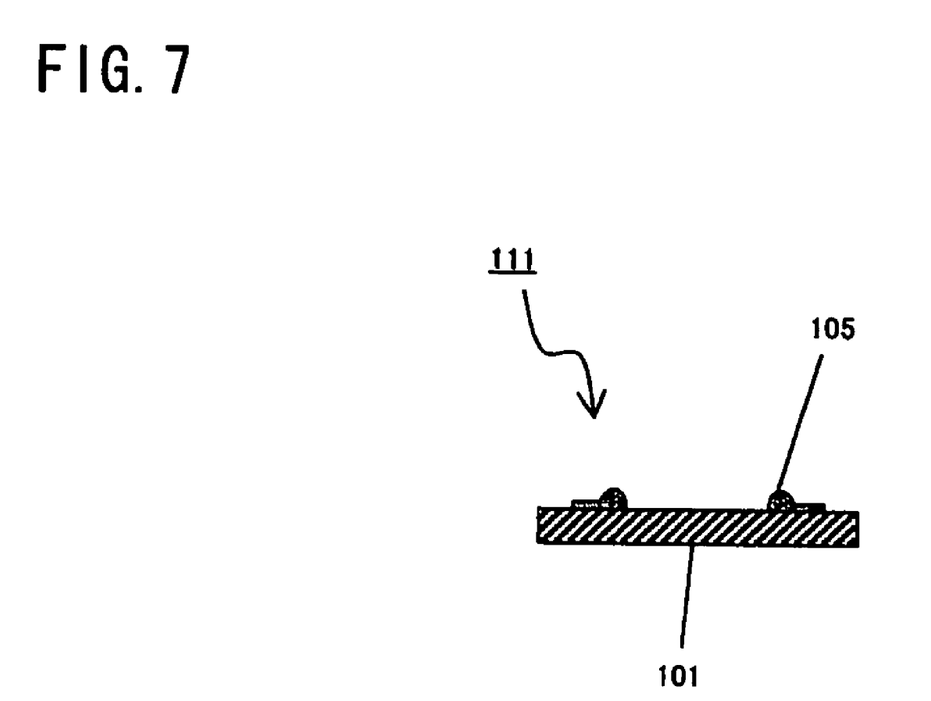
FIG. 7 is a cross-sectional view illustrating the substrate combined with rubber parts.

In this vulcanizing step, the unvulcanized rubber seals 4 are vulcanized so that vulcanized rubber seals 105 are combined with the substrate 101, thus the rubber parts are combined with the completed substrate 111, which has a desired three-dimensional shape, FIG. 7.

In other words, since the molding step and the vulcanizing step by the present embodiment are carried out at a relatively low temperature, a shrinkage difference between the rubber part and an object to be combined with can be kept small.

As mentioned above, in the method for manufacturing the rubber parts combined with the substrate by the present embodiment, since the molding step, the vulcanizing step and the adhering step can be carried out at a relatively low temperature and since rubber parts having a desired shape can be formed precisely at designed positions, the method by the present embodiment can be preferably applied to methods for manufacturing planar products having a large surface area such as a separator with a sealing structure for a fuel cell, a gasket for a hard disk drive and the like.

Further, in the conventional vulcanizations, they are usually carried out at ca. 170° C., while in the present embodiment, parts are molded and vulcanized at an ordinary temperature or the like, so that rubber parts can be formed even on substrates, which are not allowed to heat or which degenerate when heated.

In conventional methods, usually engineering plastic such as PPS, PES, polyimide or the like is selected as a resin for forming parts combined with the substrate by the vulcanization in view of heat resistance properties of the resin. Consequently, it is inevitable that costs for manufacturing products employing such engineering plastic are remarkably high. On the other hand, plastics such as PE, PP and PS, which can not be employed in the conventional methods, can be employed in the present invention, so that the method by the present invention enable the manufacturing costs to be reduced to a larger extent.

The present invention is not limited to the above-mentioned examples, but can be utilized widely.

In the above-mentioned manufacturing method, a transfer molding is explained as the molding step, the present invention can be also applied to other molding methods such as a compression molding, an injection molding and the like.

When other steps in the compression molding and the injection molding are carried out in the same ways as in the method by the present embodiment, the same effects are attained.

As explained, in addition to the ordinary substrate, the present embodiment can provide the method for manufacturing the rubber parts combined with the substrate, even for the substrate which is not allowed to press or is deformed when pressed.

If the substrate has a heat resistance, a heated vulcanization step can be employed as the vulcanizing step. In this case the precise positioning of the rubber parts may not attained due to expansion or contraction of the rubber parts caused by heating. But the preciseness can be compensated by selecting rubber material and placing the rubber parts in accordance with calculated heat deformations. As described in embodiment 1, embodiment 2 can also attain improved effects to raise a manufacturing capacity by arranging the molding step and the vulcanizing step separately, even when the heated vulcanizing step is employed.

POSSIBILITIES OF INDUSTRIAL USE

As explained above, the present invention provides a method for manufacturing the rubber parts having a three-dimensional shape combined with the substrate, the combination being capable of molding, vulcanizing and adhering at a relatively low temperature.

By employing this method, rubber parts can be molded on the substrate which is not allowed to heat or deformed when heated.

In the conventional method the molding cycle is determined by a period for vulcanizing, while the molding cycle of the present invention is determined only by a period for molding the rubber material by arranging the molding step and the vulcanizing step as separated steps. As a result, the manufacturing period is so much reduced that the production capacity of the die assembly is remarkably raised.

Since burrs formed in the pot region of the die and sprues are not vulcanized, they can be recycled as the rubber material so that a yield of the rubber material is raised to a large extent.

In addition, in the conventional molding method, die assemblies are designed such that the number of sprues is restricted as few as possible in order to raise a yield of the rubber material, but in the present invention die assemblies can be freely designed without considering such restriction.

Since the molding step and the vulcanizing step by the present embodiment are carried out at a relatively low temperature, a shrinkage difference between the rubber parts and an object to be combined with can be kept small so that the anchor effect is maintained after the vulcanization, consequently, the adhering step by the adhesive can be omitted.

Further, rubber parts can be molded on the substrate which is not allowed to press or deformed when pressed.

What is claimed is:

1. A method for manufacturing rubber parts combined with a substrate at precise positions on said substrate comprising:
    placing said substrate in a first lower die having a substrate region in which said substrate is placed;
    molding said rubber parts by casting unvulcanized rubber material into a space formed between a second further lower die and an upper die forming a first die assembly;
    positioning said cast unvulcanized molded rubber parts at desired positions on said substrate by replacing said second lower die with said first lower die having said substrate region and positioned parts on the second die to form a second die assembly;
    removing the substrate and positioned unvulcanized rubber parts on the substrate from said second die assembly; and
    vulcanizing said unvulcanized rubber parts to said substrate without heating.

2. In a method for manufacturing rubber parts combined with a substrate at precise positions on said substrate comprising the steps:
    placing said substrate in a first lower die having a substrate region on which said substrate is placed;
    molding unvulcanized rubber parts by casting them into a space formed between a second lower die and an upper die forming a first die assembly;
    positioning said unvulcanized molded rubber parts at desired positions on said substrate by replacing said second lower die with said first lower die having said substrate region including the substrate and forming a second die assembly with the upper die including the rubber parts; and
    removing said substrate and said unvulcanized rubber parts positioned on said substrate from said second die assembly.

3. The method of claim 2 including the step of vulcanizing the substrate to said unvulcanized rubber parts to combine the rubber parts with said substrate without heating.

* * * * *